(12) United States Patent
Wise (10) Patent No.: US 10,356,590 B2
(45) Date of Patent: Jul. 16, 2019

(54) SYSTEM AND METHOD FOR RESPONDING TO EMERGENCIES USING ROBOTIC ASSISTANCE

(71) Applicant: Fetch Robotics, Inc., San Jose, CA (US)

(72) Inventor: Melonee Wise, San Jose, CA (US)

(73) Assignee: Fetch Robotics, Inc., San Jose, CA (US)

( * ) Notice: Subject to any disclaimer, the term of this patent is extended or adjusted under 35 U.S.C. 154(b) by 355 days.

(21) Appl. No.: 15/382,024

(22) Filed: Dec. 16, 2016

(65) Prior Publication Data

US 2018/0169866 A1 Jun. 21, 2018

(51) Int. Cl.
G05D 1/00 (2006.01)
H04W 4/90 (2018.01)
G05D 1/10 (2006.01)
H04W 84/18 (2009.01)

(52) U.S. Cl.
CPC .............. *H04W 4/90* (2018.02); *G05D 1/104* (2013.01); *H04W 84/18* (2013.01)

(58) Field of Classification Search
None
See application file for complete search history.

(56) References Cited

U.S. PATENT DOCUMENTS

| | | | | |
|---|---|---|---|---|
| 7,783,385 | B2 * | 8/2010 | Tamura | H04Q 9/00 340/541 |
| 8,346,391 | B1 * | 1/2013 | Anhalt | B25J 9/163 700/248 |
| 9,819,713 | B2 * | 11/2017 | Siminoff | G08B 27/001 |
| 9,819,911 | B2 * | 11/2017 | K V | B64C 39/024 |
| 10,035,259 | B1 * | 7/2018 | Cheng | B25J 11/0025 |
| 10,120,377 | B2 * | 11/2018 | Lai | G05D 1/0027 |
| 10,137,984 | B1 * | 11/2018 | Flick | G08G 5/045 |
| 2006/0079997 | A1 * | 4/2006 | McLurkin | G05D 1/0297 700/245 |
| 2009/0303042 | A1 * | 12/2009 | Song | G08B 13/19647 340/566 |
| 2011/0130636 | A1 * | 6/2011 | Daniel | G08B 25/016 600/301 |
| 2011/0135189 | A1 * | 6/2011 | Lee | B25J 9/1682 382/153 |

(Continued)

*Primary Examiner* — Jonathan M Dager
(74) *Attorney, Agent, or Firm* — J. Steven Svoboda (57) ABSTRACT

A method includes: providing to a robot, by a system, a predetermined behavior configured to help an emergency responder; directing the robot, by the system, to a designated location; instructing the robot, by the system, to gather emergency data; receiving, by the system, from the robot, the gathered emergency data; and transmitting the emergency data, by the system, to the emergency responder. A method for responding to emergencies using robotic assistance includes: receiving, by a robot, from a system for responding to emergencies using robotic assistance, a predetermined behavior configured to help an emergency responder; instituting, by the robot, the predetermined behavior; receiving, by the robot, a direction to a designated location; proceeding, by the robot, to the designated location; receiving, by the robot, an instruction to gather emergency data; gathering, by the robot, the emergency data; and transmitting, by the robot to the system, the gathered emergency data.

45 Claims, 5 Drawing Sheets

(56) References Cited

U.S. PATENT DOCUMENTS

| | | | | |
|---|---|---|---|---|
| 2014/0027131 A1* | 1/2014 | Kawiecki | A62C 3/0242 |
| | | | 169/45 |
| 2014/0150806 A1* | 6/2014 | Hu | A61B 5/0002 |
| | | | 128/870 |
| 2014/0254896 A1* | 9/2014 | Zhou | B25J 9/0006 |
| | | | 382/124 |
| 2015/0205298 A1* | 7/2015 | Stoschek | G05D 1/021 |
| | | | 701/23 |
| 2015/0290808 A1* | 10/2015 | Renkis | H04N 7/181 |
| | | | 700/257 |
| 2015/0339912 A1* | 11/2015 | Farrand | G08B 25/001 |
| | | | 340/501 |
| 2016/0063642 A1* | 3/2016 | Luciani | G06Q 40/08 |
| | | | 705/4 |
| 2016/0107749 A1* | 4/2016 | Mucci | B64C 39/024 |
| | | | 701/3 |
| 2016/0116914 A1* | 4/2016 | Mucci | G05D 1/101 |
| | | | 701/2 |
| 2016/0207193 A1* | 7/2016 | Wise | B25J 5/007 |
| 2016/0266577 A1* | 9/2016 | Kerzner | G05D 1/0022 |
| 2016/0340006 A1* | 11/2016 | Tang | B63C 9/01 |
| 2017/0187993 A1* | 6/2017 | Martch | B64C 39/024 |
| 2017/0253330 A1* | 9/2017 | Saigh | B64C 39/024 |
| 2017/0350959 A1* | 12/2017 | Yaqub | G01S 5/0289 |
| 2018/0007518 A1* | 1/2018 | O'Berry | H04W 4/046 |

* cited by examiner

SYSTEM AND METHOD FOR RESPONDING TO EMERGENCIES USING ROBOTIC ASSISTANCE

SUMMARY

Embodiments of this invention relate in general to a system and method for responding to emergencies using robotic assistance.

A method for responding to emergencies using robotic assistance includes: providing to a robot, by a system for responding to emergencies using robotic assistance, a predetermined behavior configured to help an emergency responder; directing the robot, by the system, to a designated location; instructing the robot, by the system, to gather emergency data; receiving, by the system, from the robot, the gathered emergency data; and transmitting the emergency data, by the system, to the emergency responder.

A method for responding to emergencies using robotic assistance includes: providing to a robot, by a system for responding to emergencies using robotic assistance, a predetermined behavior configured to help an emergency responder wherein the behavior is predetermined according to one or more of user-set criteria and a training run of the system; directing the robot, by the system, to a designated location; instructing the robot, by the system, to gather emergency data by doing one or more of tracking human movement and counting humans; receiving, by the system, from the robot, the gathered emergency data; transmitting the emergency data, by the system, to the emergency responder; receiving, by the system, a query from the emergency responder; selected a robot, by the system, to formulate a response to the query; forwarding the query, by the system, to the selected robot; receiving the response to the query, by the system, from the robot; sending the response, by the system, to the emergency responder; recording, by the system, data regarding a robot response to the emergency; playing back, by the system, the recorded data; and analyzing, by the system, the recorded data to improve emergency procedures.

A method for responding to emergencies using robotic assistance includes: receiving, by a robot, from a system for responding to emergencies using robotic assistance, a predetermined behavior configured to help an emergency responder; instituting, by the robot, the predetermined behavior; receiving, by the robot, a direction to a designated location; proceeding, by the robot, to the designated location; receiving, by the robot, an instruction to gather emergency data; gathering, by the robot, the emergency data; and transmitting, by the robot to the system, the gathered emergency data.

DESCRIPTION OF THE DRAWINGS

The accompanying drawings provide visual representations which will be used to more fully describe various representative embodiments and can be used by those skilled in the art to better understand the representative embodiments disclosed herein and their inherent advantages. In these drawings, like reference numerals identify corresponding elements.

DETAILED DESCRIPTION

While the present invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the following description and in the several figures of the drawings, like reference numerals are used to describe the same, similar or corresponding parts in the several views of the drawings.

For example, the emergency comprises one or more of a fire, an earthquake, a flood, a tornado, a hurricane, a typhoon, a robbery, a burglary, and another emergency. The robotic behaviors can be predetermined according to one or more of user-set criteria and a training run of the system. In this system, the main server that controls the fleet of robots is connected to the emergency system in such a way that the emergency system can trigger specific types of behaviors within the fleet. The system can also generate training data that can help improve emergency response behavior in the future.

According to embodiments of the invention, robotic fleets have predetermined behaviors that can help emergency responders in emergency situations. For example, the predetermined behavior comprises one or more of the robot positioning one or more of itself and a second robot in a more optimal position for emergency response, searching for a location of the emergency, leading an emergency responder to one or more of an emergency response location and a human; informing a human that one or more of a human and a third robot is coming; and another predetermined behavior.

For example, positioning comprises positioning the one or more of itself and a second robot so as to be out of way of an emergency responder. For example, positioning comprises positioning the one or more of itself and a second robot so as to gather the emergency data. For example, searching for the location of the emergency comprises searching for one or more of flames, smoke, holes in a site of the emergency, earthquake damage in the site, water, wind, criminals, damage to the site from one or more of a robbery and a burglary, and another location of the emergency. For example, leading comprises playing a media. For example, the media comprises audio.

During an emergency, at least one robot can be directed to one or more of a staging area out of the way of humans and to an emergency response position. For example, all robots can be directed to one or more of the staging area and the emergency response position. For example, the emergency response position comprises an end of a specified aisle. To respond to the emergency, the robot can do one or more of look for movement and monitor humans in the system. Monitoring can comprise one or more of tracking and counting.

As humans move around the facility, the robots can track the majority of the movements and give a count of the number of humans who have left the through the exits. This number can then be transmitted to emergency responders to help them confirm the number of humans outside a site of the emergency. For example, the site comprises a building. The emergency responders could also send a query to the system to see if the robots detect motion within the facility.

If motion is detected within a site of the emergency, the emergency responders can request one or more of a map of the system and a map location of the motion.

The emergency responders can send a robot to investigate the motion.

The emergency responders can request a robot to stream sensor data of the region for inspection before a human enters the site.

The emergency responders could send audio for some or all robots to play. For example, the audio can provide directions to any human left within the site.

After an emergency has taken place, the recorded data from the robots can be recovered and played back and analyzed to improve emergency procedures. Recorded data that could be gathered includes: a time for a human to exit a site of the emergency, an average time for a human to exit the site, a number of humans leaving through an exit from the site, exit congestion behavior, an average distance a human travels to exit the site, information about any items that may have blocked an exit, and other data.

The system may devise ways that emergency procedures can be improved. For example, if the playback shows a lot of congestion at all exits, the system can recommend increasing the number of exits. If the playback shows many humans going to one exit instead of using the closest exit, the system can recommend training humans to use alternate exits that are closer.

A spatial region may further comprise a robot storage configured to store robots that are not currently engaged in a task. The robot storage may comprise one or more robot charging stations configured to charge robots not currently engaged in a task.

Figure 1A:
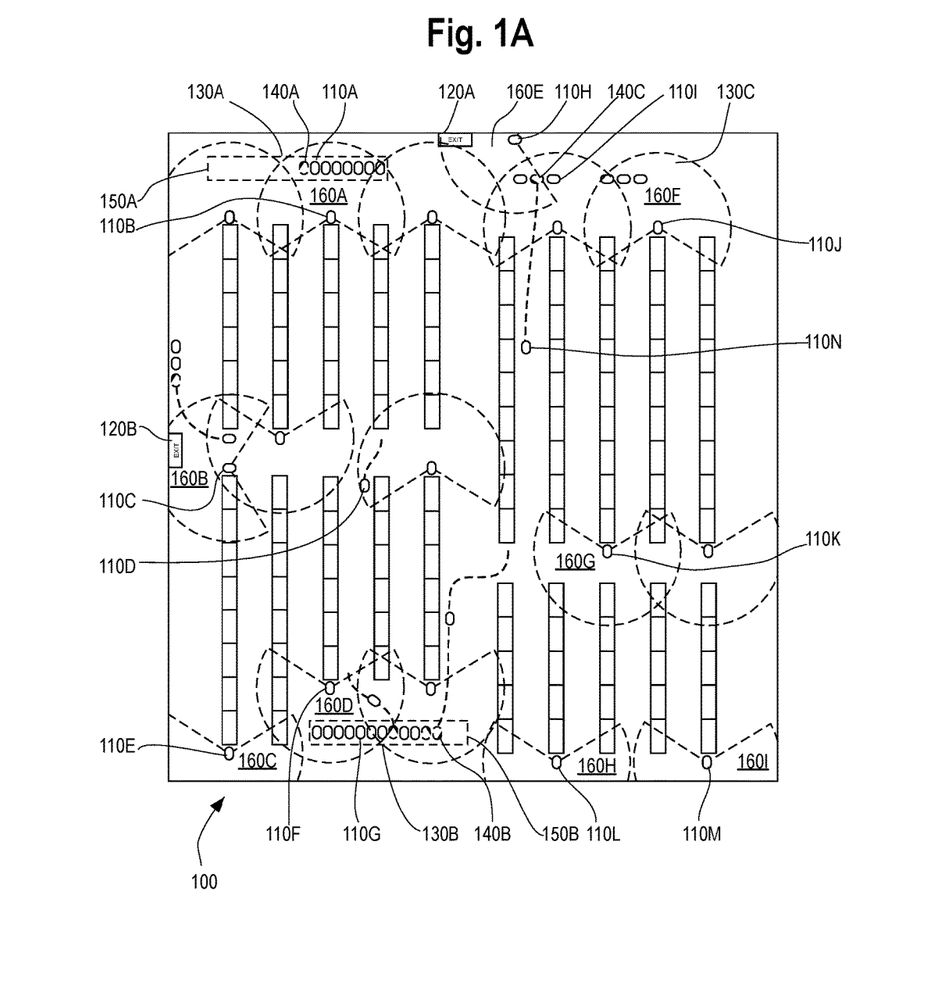
FIGS. 1A-1B are a set of two diagrams of a system for responding to emergencies using robotic assistance.
Figure 1B:
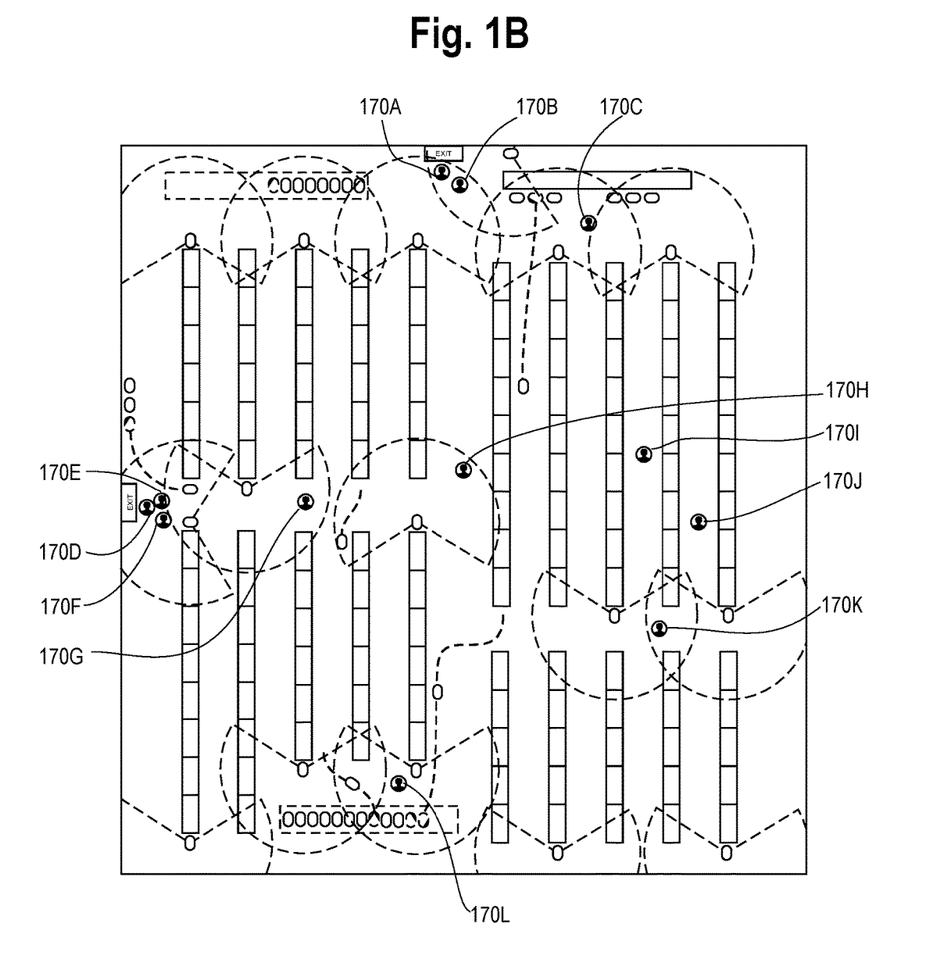

FIGS. 1A-1B are a set of two diagrams of a system for responding to emergencies using robotic assistance. FIGS. 1A-1B show an example of how the robots might be dispersed within a site to monitor major aisles and exits. The dashed semi-circular areas show the region that the robot can see.

As depicted in FIG. 1A, a system 100 for responding to emergencies using robotic assistance comprises robots 110A-110N. The depicted system 100 further comprises a first exit 120A and a second exit 120B.

The system 100 further comprises a first robot storage 130A configured to store robots 110A-110N that are not currently engaged in a task. The system 100 further comprises a second robot storage 130B configured to store robots 110A-110N that are not currently engaged in a task. The system 100 further comprises a wall 130C configured to store robots 110A-110N that are not currently engaged in a task. Currently, the first robot storage 130A comprises the robot 110A and five other robots 110A-110N as well as one open slot 140A. Currently, the second robot storage 130B comprises the robot 110G and eight other robots 110A-110N as well as three open slots including the open slot 140B. Currently, the wall 130C comprises the robot 110I and three other robots 110A-110N as well as one open slot 140C.

One or more of the robot storages 130A-130B may comprise one or more robot charging stations configured to charge robots 110A-110N that are not currently engaged in a task. As depicted, the first robot storage 130A comprises a first robot charging station 150A. As depicted, the second robot storage 130B comprises a second robot charging station 150B.

Currently, the system 100 comprises the robots 110A-110N including the active robots 110B-110C, 110E-110F, 110H, and 110J-110M. The active robot 110B monitors a region 160A. Similarly, the active robots 110C, 110E, 110F, 110H, 110J, 110K, 110L, and 110M monitor respective regions 160B, 160C, 160D, 160E, 160F, 160G, 160H, and 160I. Active robots 110A-110N can monitor overlapping regions 160A-160I. For example, the regions 160A-160I may comprise portions of circles. For example, as depicted, the region 160C monitored by the active robot 110E partially overlaps with the region 160D monitored by the active robot 110F. Regions 160A-160I are sometimes not portions of a circle. For example, the region 160E monitored by the active robot 110H is not semicircular because it is partially bounded by the system 100. Currently, the system 100 further comprises the robots 110D and 110N that are being sent into action.

FIG. 1B shows the system 100 comprising the same elements shown in FIG. 1A, including the robots 110A-110N, the first exit 120A, the second exit 120B, the robot storages 130A-130B, the open slots 140A-140C, the robot charging stations 150A-150C, and the regions 160A-160I, and also shows humans 170A-170L.

Figure 2:
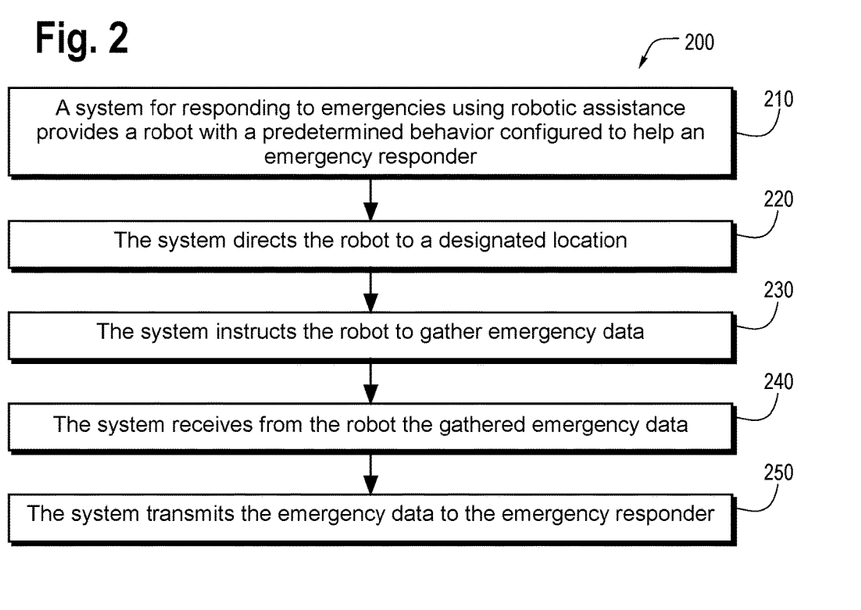
FIG. 2 is a flowchart of a method for responding to emergencies using robotic assistance.

FIG. 2 is a flowchart of a method 200 for responding to emergencies using robotic assistance. The order of steps in the method 200 is not constrained to that shown in FIG. 2 or described in the following discussion. Several of the steps could occur in different order without affecting the final result.

In step 210, a system for responding to emergencies using robotic assistance provides a robot with a predetermined behavior configured to help an emergency responder. Block 210 then transfers control to block 220.

In step 220, the system directs the robot to a designated location. For example, the directing step comprises directing all robots to the designated location. For example, the designated location comprises one or more of a staging area and an emergency response position. For example, the emergency response position comprises an end of a specified aisle. For example, the designated location is chosen to be located far from humans. Block 220 then transfers control to block 230.

In step 230, the system instructs the robot to gather emergency data. For example, gathering emergency data comprises gathering emergency data using the predetermined behavior. For example, gathering emergency data comprises one or more of tracking human movement and counting humans. For example, counting comprises counting one or more of humans safely outside a site of the emergency, humans remaining in the site and humans who leave through an exit from the site. Block 230 then transfers control to block 240.

In step 240, the system receives from the robot the gathered emergency data. Block 240 then transfers control to block 250.

In step 250, the system transmits the emergency data to the emergency responder. Block 250 then terminates the process.

The method may include additional steps of receiving a query from the emergency responder; selecting a robot to formulate a response to the query; forwarding the query to the selected robot; receiving the response to the query from the robot; and sending the response to the emergency responder.

The method may include an additional step of, if motion is detected, directing a robot to investigate the motion.

The method may include additional steps of recording data regarding a robot response to the emergency, playing back the recorded data, and analyzing the recorded data to improve emergency procedures.

Figure 3:
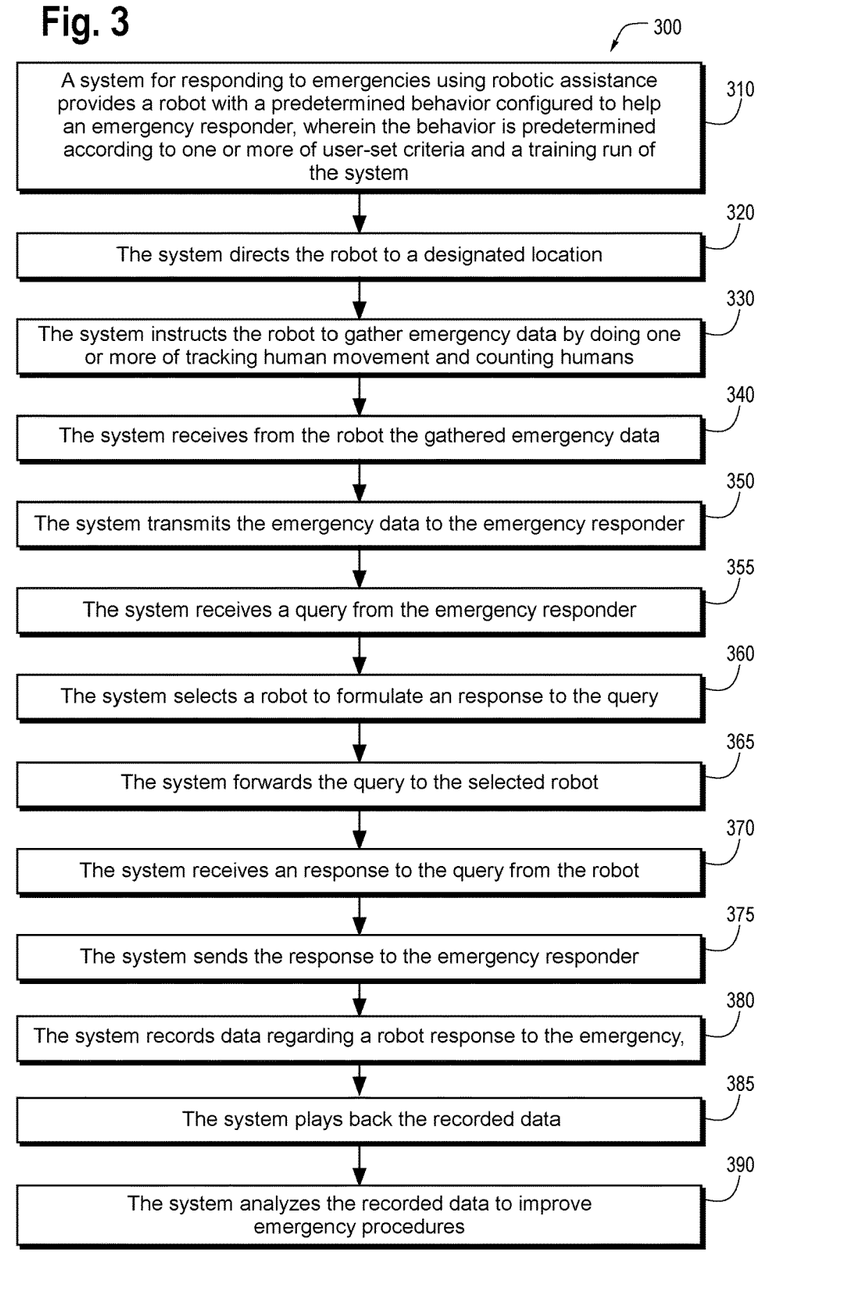
FIG. 3 is a flowchart of a method for responding to emergencies using robotic assistance.

FIG. 3 is a flowchart of a method 300 for responding to emergencies using robotic assistance. The order of steps in the method 300 is not constrained to that shown in FIG. 3 or described in the following discussion. Several of the steps could occur in different order without affecting the final result.

In step 310, a system for responding to emergencies using robotic assistance provides a robot with a predetermined behavior configured to help an emergency responder, wherein the behavior is predetermined according to one or more of user-set criteria and a training run of the system. Block 310 then transfers control to block 320.

In step 320, the system directs the robot to a designated location. Block 320 then transfers control to block 230.

In step 330, the system instructs the robot to gather emergency data by doing one or more of tracking human movement and counting humans. Block 330 then transfers control to block 340.

In step 340, the system receives from the robot the gathered emergency data. Block 340 then transfers control to block 350.

In step 350, the system transmits the emergency data to the emergency responder. Block 350 then transfers control to block 355.

In step 355, the system receives a query from the emergency responder. For example, the query asks if a robot detects motion within the system. For example, the query comprises robot data of a region to be inspected before a human begins the inspection. For example, the query comprises the robot data of the region to be inspected. For example, the query comprises sensor data of the region to be inspected. For example, the sensor data comprises streaming sensor data. For example, the query comprises playing a media to a human. For example, the media comprises one or more of audio and video. For example, the media provides instructions to a human located within the system. Block 355 then transfers control to block 360.

In step 360, the system selects a robot to formulate a response to the query. For example, the response comprises the robot data of the region to be inspected. For example, the response comprises sensor data of the region to be inspected. For example, the sensor data comprises streaming sensor data. For example, the response comprises playing a media to a human. For example, the media comprises one or more of audio and video. For example, the media provides instructions to a human located within a site of the emergency. Block 360 then transfers control to block 365.

In step 365, the system forwards the query to the selected robot. Block 365 then transfers control to block 370.

In step 370, the system receives a response to the query from the robot. Block 370 then transfers control to block 375.

In step 375, the system sends the response to the emergency responder. Block 375 then transfers control to block 380.

In step 380, the system records data regarding a robot response to the emergency. Block 380 then transfers control to block 385.

In step 385, the system plays back the recorded data. Block 385 then transfers control to block 390.

In step 390, the system analyzes the recorded data to improve emergency procedures. Block 390 then terminates the process.

Figure 4:
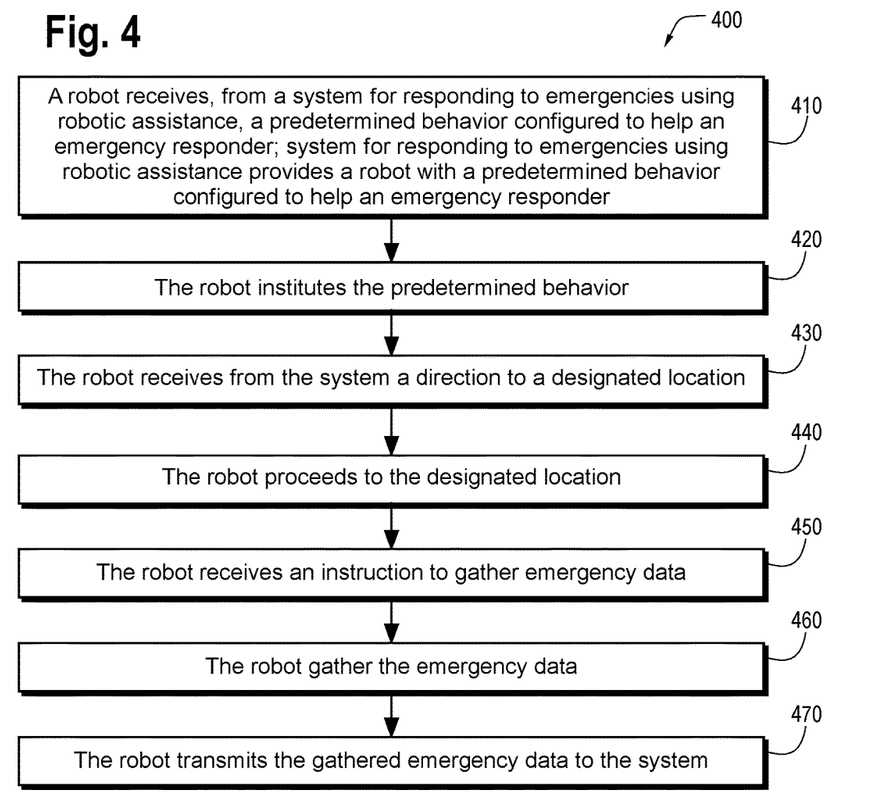
FIG. 4 is a flowchart of a method for responding to emergencies using robotic assistance.

FIG. 4 is a flowchart of a method 400 for responding to emergencies using robotic assistance. The order of steps in the method 400 is not constrained to that shown in FIG. 4 or described in the following discussion. Several of the steps could occur in different order without affecting the final result. The method 200 can potentially be simultaneously run over two or more of the queued tasks in a task server's task queue.

In step 410, a robot receives, from a system for responding to emergencies using robotic assistance, a predetermined behavior configured to help an emergency responder; system for responding to emergencies using robotic assistance provides a robot with a predetermined behavior configured to help an emergency responder. Block 410 then transfers control to block 420.

In step 420, the robot institutes the predetermined behavior. Block 420 then transfers control to block 430.

In step 430, the robot receives from the system a direction to a designated location. Block 430 then transfers control to block 440.

In step 440, the robot proceeds to the designated location. Block 440 then transfers control to block 450.

In step 450, the robot receives an instruction to gather emergency data. Block 450 then transfers control to block 460.

In step 460, the robot gathers the emergency data. Block 460 then transfers control to block 470.

In step 470, the robot transmits the gathered emergency data to the system. Block 470 then terminates the process.

The method may include additional steps of receiving from the system a query from the emergency responder; responding to the query; and sending the response to the system.

The method may include an additional step of, if motion is detected, investigating the motion.

It will be understood by those skilled in the art that software used by the system and method for responding to emergencies using robotic assistance may be located in any location in which it may be accessed by the system. It will be further understood by those of skill in the art that the number of variations of the network, the location of the software, and the like are virtually limitless.

It will be understood by those skilled in the art that various changes may be made in the form and details of the described embodiments resulting in equivalent embodiments that remain within the scope of the invention. For example, it will be understood by one of ordinary skill in the art that the order of certain steps and certain components can be altered without substantially impairing the functioning of the invention. It is intended, therefore, that the subject matter in the above description shall be interpreted as illustrative and shall not be interpreted in a limiting sense.

I claim:

1. A method for responding to emergencies using robotic assistance, comprising:
   providing to a robot, by a system for responding to emergencies using robotic assistance, a predetermined behavior configured to help an emergency responder;
   directing the robot, by the system, to a designated location;
   instructing the robot, by the system, to gather emergency data;
   receiving, by the system, from the robot, the gathered emergency data;
   transmitting the emergency data, by the system, to the emergency responder;
   receiving a query, by the system from the emergency responder;
   selecting a robot, by the system, to formulate a response to the query;
   forwarding the query, by the system, to the selected robot;

receiving the response to the query, by the system, from the robot; and sending the response, by the system, to the emergency responder.

2. The method of claim 1, wherein the predetermined behavior comprises one or more of the robot positioning one or more of itself and a second robot in a more optimal position for emergency response, searching for a location of the emergency, leading an emergency responder to one or more of an emergency response location and a human; and informing a human that one or more of a human and a third robot is coming.

3. A method for responding to emergencies using robotic assistance, comprising:

providing to a robot, by a system for responding to emergencies using robotic assistance, a predetermined behavior configured to help an emergency responder;

directing the robot, by the system, to a designated location;

instructing the robot, by the system, to gather emergency data;

receiving, by the system, from the robot, the gathered emergency data; and transmitting the emergency data, by the system, to the emergency responder, wherein the predetermined behavior comprises one or more of the robot positioning one or more of itself and a second robot in a more optimal position for emergency response, searching for a location of the emergency, leading an emergency responder to one or more of an emergency response location and a human; and informing a human that one or more of a human and a third robot is coming, wherein positioning comprises positioning the one or more of itself and a second robot so as to be out of way of an emergency responder.

4. The method of claim 2, wherein positioning comprises positioning the one or more of itself and a second robot so as to gather the emergency data.

5. The method of claim 2, wherein searching for the location of the emergency comprises searching for one or more of flames, smoke, holes in a site of the emergency, earthquake damage in the site, water, wind, criminals, damage to the site from one or more of a robbery and a burglary.

6. A method for responding to emergencies using robotic assistance, comprising:

providing to a robot, by a system for responding to emergencies using robotic assistance, a predetermined behavior configured to help an emergency responder;

directing the robot, by the system, to a designated location;

instructing the robot, by the system, to gather emergency data;

receiving, by the system, from the robot, the gathered emergency data; and transmitting the emergency data, by the system, to the emergency responder, wherein the predetermined behavior comprises one or more of the robot positioning one or more of itself and a second robot in a more optimal position for emergency response, searching for a location of the emergency, leading an emergency responder to one or more of an emergency response location and a human; and informing a human that one or more of a human and a third robot is coming, wherein leading comprises playing a media.

7. The method of claim 6, wherein the media comprises audio.

8. The method of claim 1, wherein the designated location comprises one or more of a staging area and an emergency response position, and an end of a specified aisle.

9. The method of claim 1, wherein the emergency comprises one or more of a fire, an earthquake, a flood, a tornado, a hurricane, a typhoon, a robbery, and a burglary.

10. The method of claim 1, wherein the behavior is predetermined according to one or more of user-set criteria and a training run of the system.

11. A method for responding to emergencies using robotic assistance, comprising:

providing to a robot, by a system for responding to emergencies using robotic assistance, a predetermined behavior configured to help an emergency responder;

directing the robot, by the system, to a designated location;

instructing the robot, by the system, to gather emergency data;

receiving, by the system, from the robot, the gathered emergency data; and transmitting the emergency data, by the system, to the emergency, wherein the designated location is chosen to be located far from humans.

12. The method of claim 1, wherein the directing step comprises directing all robots to the designated location.

13. A method for responding to emergencies using robotic assistance, comprising:

providing to a robot, by a system for responding to emergencies using robotic assistance, a predetermined behavior configured to help an emergency responder;

directing the robot, by the system, to a designated location;

instructing the robot, by the system, to gather emergency data;

receiving, by the system, from the robot, the gathered emergency data; and transmitting the emergency data, by the system, to the emergency responder, wherein the designated location comprises one or more of a staging area and an emergency response position, and an end of a specified aisle, wherein the designated location comprises an end of a specified aisle.

14. The method of claim 1, wherein gathering emergency data comprises gathering emergency data using the predetermined behavior.

15. The method of claim 1, wherein gathering emergency data comprises one or more of tracking human movement and counting humans.

16. A method for responding to emergencies using robotic assistance, comprising:

providing to a robot, by a system for responding to emergencies using robotic assistance, a predetermined behavior configured to help an emergency responder;

directing the robot, by the system, to a designated location;

instructing the robot, by the system, to gather emergency data;

receiving, by the system, from the robot, the gathered emergency data; and transmitting the emergency data, by the system, to the emergency responder, wherein gathering emergency data comprises one or more of tracking human movement and counting humans, wherein counting comprises counting one or more of humans safely outside of a site of the emergency, humans remaining in the site and humans who leave through an exit from the site.

17. A method for responding to emergencies using robotic assistance, comprising:
> providing to a robot, by a system for responding to emergencies using robotic assistance, a predetermined behavior configured to help an emergency responder;
> directing the robot, by the system, to a designated location;
> instructing the robot, by the system, to gather emergency data;
> receiving, by the system, from the robot, the gathered emergency data; and
> transmitting the emergency data, by the system, to the emergency responder, further including steps of:
> receiving a query from the emergency responder;
> selecting a robot to formulate a response to the query;
> forwarding the query to the selected robot;
> receiving the response to the query from the robot; and
> sending the response to the emergency responder, wherein the query asks if a robot detects motion within a site of the emergency.

18. The method of claim 17, wherein the response comprises, if motion is detected within the site, one or more of a map of the system and a map location of the motion.

19. The method of claim 17, further comprising a step of:
> if motion is detected, directing the robot to investigate the motion.

20. The method of claim 16, wherein the query comprises robot data of a region to be inspected before a human begins the inspection.

21. The method of claim 20, wherein the response comprises the robot data of the region to be inspected.

22. The method of claim 20, wherein the response comprises sensor data of the region to be inspected.

23. The method of claim 22, wherein the sensor data comprises streaming sensor data.

24. The method of claim 16, wherein the response comprises playing a media to a human.

25. The method of claim 24, wherein the media comprises one or more of audio and video.

26. The method of claim 25, wherein the media provides instructions to a human located within a site of the emergency.

27. The method of claim 1, further comprising additional steps of:
> recording data regarding a robot response to the emergency;
> playing back the recorded data; and
> analyzing the recorded data to improve emergency procedures.

28. The method of claim 27, wherein the recorded data comprises one or more of a time for a human to exit a site of the emergency, an average time for a human to exit the site, a number of humans leaving through an exit from the site, exit congestion behavior, an average distance a human traveled to exit the site, and information about any items that may have blocked an exit.

29. A method for responding to emergencies using robotic assistance, comprising:
> providing to a robot, by a system for responding to emergencies using robotic assistance, a predetermined behavior configured to help an emergency responder, wherein the behavior is predetermined according to one or more of user-set criteria and a training run of the system;
> directing the robot, by the system, to a designated location;
> instructing the robot, by the system, to gather emergency data by doing one or more of tracking human movement and counting humans;
> receiving, by the system, from the robot, the gathered emergency data;
> transmitting the emergency data, by the system, to the emergency responder;
> receiving, by the system, a query from the emergency responder;
> selecting a robot, by the system, to formulate a response to the query;
> forwarding the query, by the system, to the selected robot;
> receiving the response to the query, by the system, from the robot;
> sending the response, by the system, to the emergency responder;
> recording, by the system, data regarding a robot response to the emergency;
> playing back, by the system, the recorded data; and
> analyzing, by the system, the recorded data to improve emergency procedures.

30. A method for responding to emergencies using robotic assistance, comprising:
> receiving, by a robot, from a system for responding to emergencies using robotic assistance, a predetermined behavior configured to help an emergency responder;
> instituting, by the robot, the predetermined behavior;
> receiving, by the robot, a direction to a designated location;
> proceeding, by the robot, to the designated location;
> receiving, by the robot, an instruction to gather emergency data;
> gathering, by the robot, the emergency data;
> transmitting, by the robot to the system, the gathered emergency data;
> receiving, by the robot, from the system, a query from the emergency responder;
> receiving, by the robot, from the system, a selection of the robot to formulate a response to the query;
> receiving the query, by the robot, from the system;
> preparing a response to the query, by the robot; and
> sending the response, by the robot, to the system.

31. The method of claim 30, wherein the designated location comprises one or more of a staging area and an emergency response position.

32. The method of claim 30, wherein the emergency comprises one or more of a fire, an earthquake, a flood, a tornado, a hurricane, a typhoon, a robbery, and a burglary.

33. The method of claim 30, wherein the behavior is predetermined according to one or more of user-set criteria and a training run of the system.

34. The method of claim 30, wherein the gathering step comprises one or more of tracking human movement and counting humans.

35. A method for responding to emergencies using robotic assistance, comprising:
> receiving, by a robot, from a system for responding to emergencies using robotic assistance, a predetermined behavior configured to help an emergency responder;
> instituting, by the robot, the predetermined behavior;
> receiving, by the robot, a direction to a designated location;
> proceeding, by the robot, to the designated location;
> receiving, by the robot, an instruction to gather emergency data;
> gathering, by the robot, the emergency data; and transmitting, by the robot to the system, the gathered emergency data, wherein the gathering step comprises one or more of tracking human movement and counting humans, wherein counting comprises counting one or more of humans safely outside of a site of the emergency, humans remaining in the site and humans who leave through an exit from the site.

36. The method of claim 30, further including steps of:
receiving from the system a query from the emergency responder;
responding to the query; and
sending the response to the system.

37. A method for responding to emergencies using robotic assistance, comprising:
receiving, by a robot, from a system for responding to emergencies using robotic assistance, a predetermined behavior configured to help an emergency responder;
instituting, by the robot, the predetermined behavior;
receiving, by the robot, a direction to a designated location;
proceeding, by the robot, to the designated location;
receiving, by the robot, an instruction to gather emergency data;
gathering, by the robot, the emergency data; and
transmitting, by the robot to the system, the gathered emergency data, further including steps of:
receiving from the system a query from the emergency responder;
responding to the query; and
sending the response to the system, wherein the query asks if a robot detects motion within a site of the emergency.

38. The method of claim 37, further comprising a step of:
if motion is detected, investigating the motion.

39. The method of claim 36, wherein the query comprises robot data of a region to be inspected before a human begins the inspection.

40. The method of claim 39, wherein the response comprises the robot data of the region to be inspected.

41. The method of claim 39, wherein the query comprises sensor data of the region to be inspected.

42. The method of claim 36, wherein the query comprises playing a media to a human.

43. The method of claim 42, wherein the media comprises audio.

44. The method of claim 43, wherein the audio provides instructions to a human still within a site of the emergency.

45. The method of claim 30, further comprising additional steps of:
recording data regarding a robot response to the emergency;
playing back the recorded data; and
analyzing the recorded data to improve emergency procedures.

* * * * *